(12) United States Patent
Hagiwara et al.

(10) Patent No.: US 8,610,550 B2
(45) Date of Patent: Dec. 17, 2013

(54) IN-VEHICLE DEVICE AND DISPLAY CONTROL SYSTEM

(75) Inventors: Masayuki Hagiwara, Kobe (JP); Satoshi Ohta, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 1070 days.

(21) Appl. No.: 12/617,105

(22) Filed: Nov. 12, 2009

(65) Prior Publication Data

US 2010/0117810 A1   May 13, 2010

(30) Foreign Application Priority Data

Nov. 13, 2008   (JP) ................................. 2008-291513

(51) Int. Cl.
*B60Q 1/00* (2006.01)

(52) U.S. Cl.
USPC ..... 340/425.5; 340/933; 340/937; 340/995.1; 340/995.11; 340/995.14; 340/995.15; 340/995.16; 340/995.18; 340/438

(58) Field of Classification Search
USPC ............ 340/933, 937, 995.1, 995.11, 995.14, 340/995.15, 995.16, 995.18, 438
See application file for complete search history.

(56) References Cited

U.S. PATENT DOCUMENTS

| 2004/0233124 A1* | 11/2004 | Eggers et al. ................. 345/1.1 |
| 2008/0040205 A1* | 2/2008 | Gold et al. ...................... 705/10 |
| 2008/0094421 A1* | 4/2008 | Maeda ........................... 345/661 |

FOREIGN PATENT DOCUMENTS

| JP | A-2000-151857 | 5/2000 |
| JP | A-2000-275056 | 10/2000 |
| JP | A-2001-014133 | 1/2001 |
| JP | A-2002-296045 | 10/2002 |
| JP | A-2003-069471 | 3/2003 |
| JP | A-2003-244343 | 8/2003 |
| JP | A-2004-028909 | 1/2004 |
| JP | A-2008-191868 | 8/2008 |
| JP | A-2008-213609 | 9/2008 |

* cited by examiner

*Primary Examiner* — Daryl Pope
(74) *Attorney, Agent, or Firm* — Oliff & Berridge, PLC

(57) ABSTRACT

An in-vehicle device for displaying a plurality of screen data generated by a mobile terminal device on one display is provided. A registering unit is configured to register partial area information in which disposition information indicating disposition of each of a plurality of partial areas which are disposed on a display area of the display are associated with priority information indicating priority of each of the partial areas. A adjusting unit is configured to adjust the display area by allocating one of the screen data to one of the partial areas based on the priority information included in the partial area information when receiving a request to display the one of the screen data on the display. A display control unit is configured to display the one of the screen data allocated to the one of the partial areas on the display based on the disposition information included in the partial area information.

19 Claims, 13 Drawing Sheets

FIG. 3

| AREA NAME | POSITION | SIZE | PRIORITY | SCREEN NAME | FIXED/NON-FIXED |
|---|---|---|---|---|---|
| AREA 1 | AA | BB x CC | 1 | SCREEN A | NO |
| AREA 2 | DD | EE x FF | 2 | SCREEN B | YES |
| ... | ... | ... | ... | ... | ... |

FIG. 5
(A) SELECTION OF MOVEMENT SOURCE
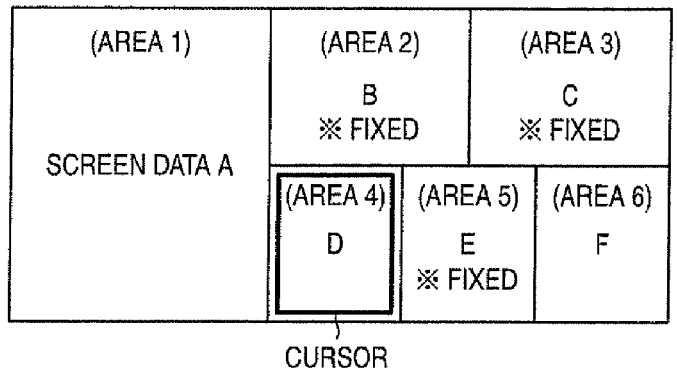
(B) SELECTION OF MOVEMENT DESTINATION
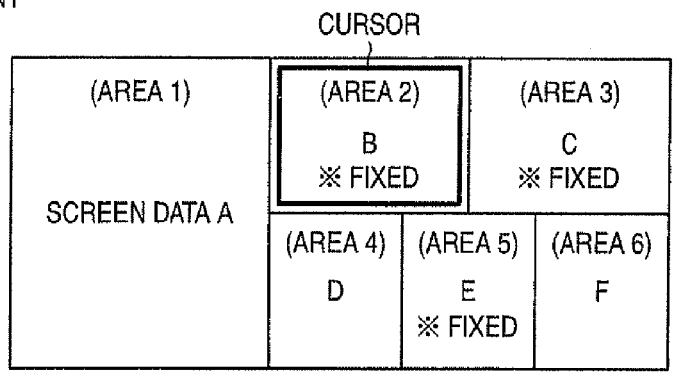
(C) AFTER MOVEMENT
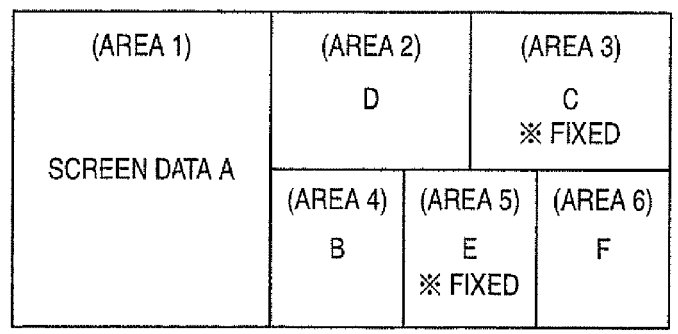

FIG. 6
(A) NUMBER OF DISPLAY IS 1
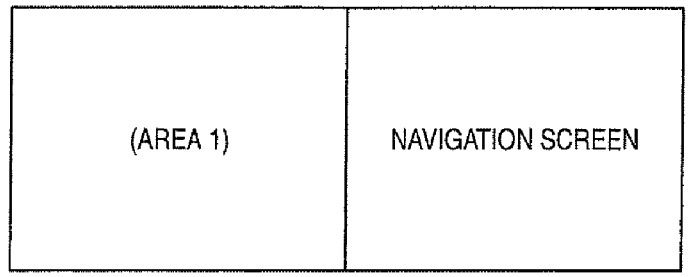
(B) NUMBER OF DISPLAY IS 2
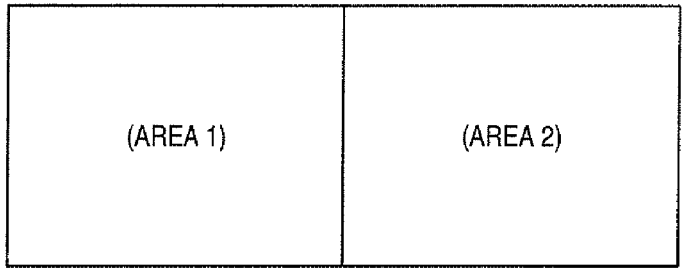
(C) NUMBER OF DISPLAY IS 3
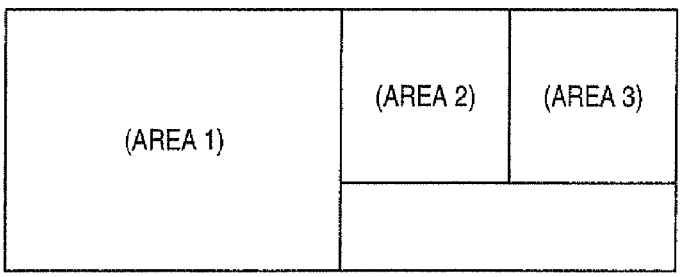
(D) NUMBER OF DISPLAY IS 4 OR MORE
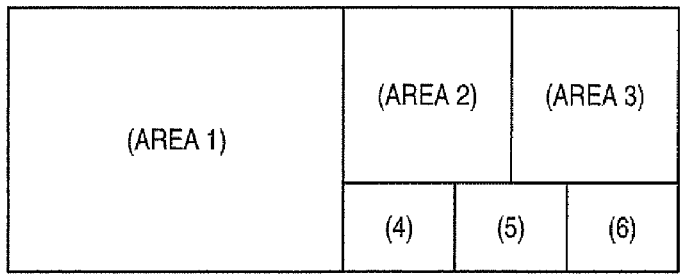

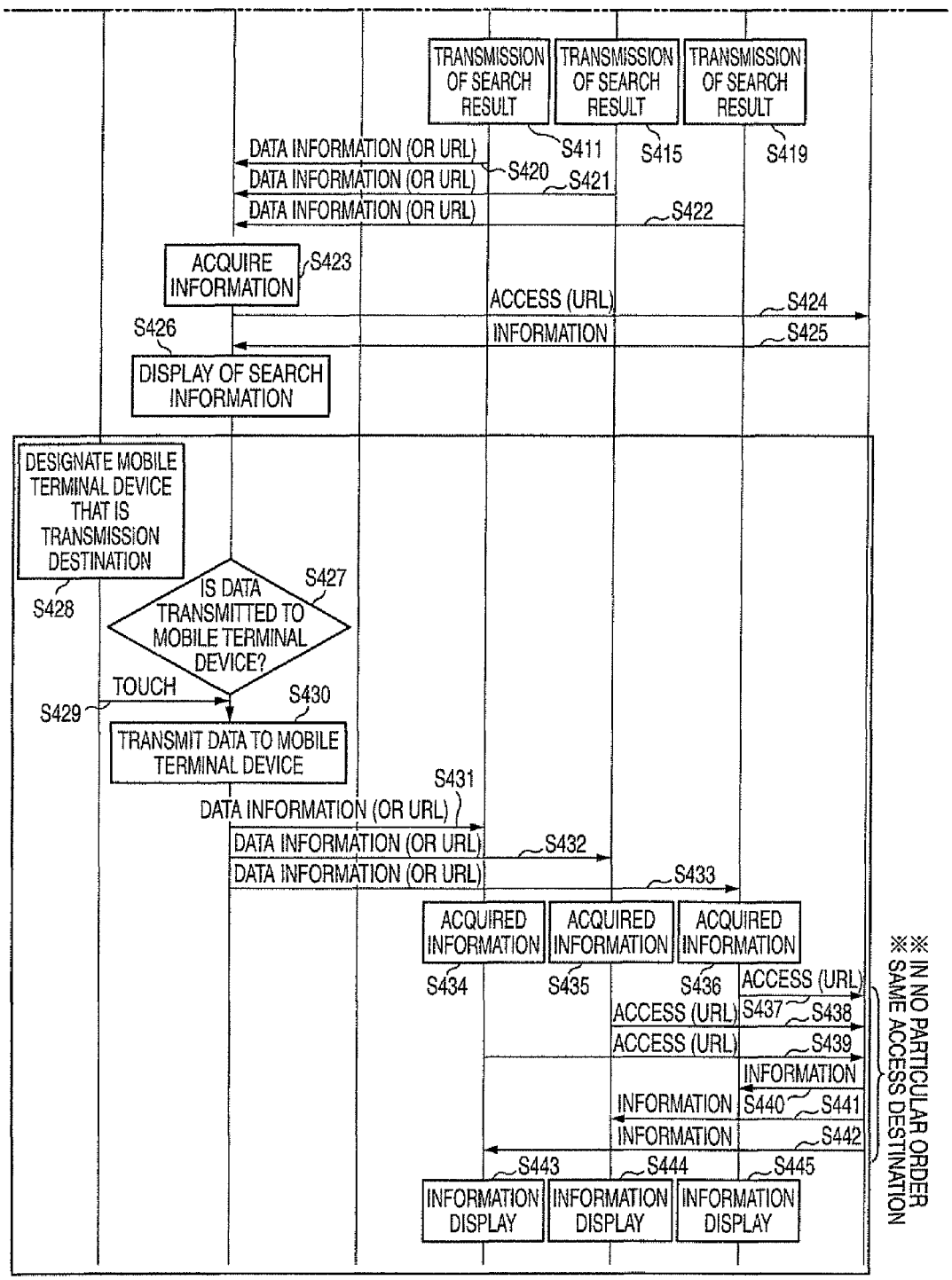

IN-VEHICLE DEVICE AND DISPLAY CONTROL SYSTEM

The disclosure of Japanese Patent Application No. 2008-291513 filed on Nov. 13, 2008 including specification, drawings and claims is incorporated herein by reference in its entirety.

BACKGROUND

The present invention relates to an in-vehicle device that displays a plurality of screen data generated by a mobile terminal device carried by a passenger on one display and a display control system including such an in-vehicle device, and more particularly, to an in-vehicle device and a display control system capable of providing a plurality of screen data for a passenger to grasp the screen data easily in a type suitable for in-vehicle circumstances.

Recently, as ear navigators providing route information to a destination have come into wide use, vehicles have been generally provided with display devices such as liquid crystal displays. In addition, mobile terminal devices such as mobile phones and PDAs (Personal Digital Assistant) have come into wide use, and screen data generated by the mobile terminal devices have been displayed on the display devices built into vehicles.

When the plurality of screen data generated by one mobile terminal device or the plurality of screen data generated by a plurality of mobile terminal devices are displayed on one display device, it is necessary to perform screen control to adjust display positions or display sizes of the screen data due to a limit of a display area of the display device. As a method of such screen control, there is a method of displaying superimposed windows corresponding to the screen data and changing positions of the windows or display order by operation of a mouse or a keyboard, which is widely used in the field of personal computers.

In a method disclosed in Patent Document 1, when a navigation screen and screens generated by a mobile phone are displayed on an in-vehicle display device, priority of positions, sizes and display orders are specified, and a window with high priority is displayed on the front side when the windows are superimposed.

Patent Document 1: Japanese Patent Publication No. 2001-014133 A

However, the screen control method used in the field of personal computers assumes the operation of a mouse or keyboard, and there is a problem in that it is difficult to perform delicate window operations in a vehicle subject to vibration. The technique of Patent Document 1 assumes that the superimposed windows are displayed and controlled, but there is also a problem in that it is difficult to pick up a desired window from the superimposed windows in the vehicle where it is difficult to perform the window operations.

In the above-described background art, a new window can be opened and the positions or the display order of the windows can be freely changed. Accordingly, the screen layout on the display device may be drastically changed by a slight mistake in operation. However, when the former window is drastically changed in in-vehicle circumstances where there is little chance of constantly looking at the display device, it is difficult to grasp the displayed contents immediately.

Arising from these points, there is a chief difficulty as to how to realize an in-vehicle device or a display control system even in in-vehicle circumstances where it is difficult to perform the screen operations due to vibration or the like and it is necessary to grasp immediately information displayed on the display device.

SUMMARY

It is therefore an object of at least one embodiment of the present invention to provide an in-vehicle device and a display control system capable of providing a plurality of screen data for a passenger to grasp the screen data easily in a type suitable for in-vehicle circumstances.

In order to achieve the above described object, according to a first aspect of at least one embodiment of the present invention, there is provided an in-vehicle device for displaying a plurality of screen data generated by a mobile terminal device on one display, the in-vehicle device comprising: a registering unit configured to register partial area information in which disposition information indicating disposition of each of a plurality of partial areas which are disposed on a display area of the display are associated with priority information indicating priority of each of the partial areas; a adjusting unit configured to adjust the display area by allocating one of the screen data to one of the partial areas based on the priority information included in the partial area information when receiving a request to display the one of the screen data on the display; and a display control unit configured to display the one of the screen data allocated to the one of the partial areas on the display based on the disposition information included in the partial area information.

According to a second aspect of at least one embodiment of the present invention, there is provided a display control system comprising: a mobile terminal device configured to generate a plurality of screen data; and an in-vehicle device configured to display the screen data on one display, wherein the in-vehicle device includes: a registering unit configured to register partial area information in which disposition information indicating disposition of each of a plurality of partial areas which are disposed on a display area of the display are associated with priority information indicating priority of each of the partial areas; a adjusting unit configured to adjust the display area by allocating one of the screen data to one of the partial areas based on the priority information included in the partial area information when receiving a request to display the one of the screen data on the display; and a display control unit configured to display the one of the screen data allocated to the one of the partial areas on the display based on the disposition information included in the partial area information, and wherein the mobile terminal device includes an input unit configured to designate the one of the partial area on which the one of the screen data is displayed from the partial areas.

According to a third aspect of at least one embodiment of the present invention, there is provided an in-vehicle device which is connectable to a plurality of mobile terminal devices via wireless communication and is configured to display a plurality of data on one display, the in-vehicle device comprising: a registering unit configured to register partial area information in which disposition information indicating disposition of each of a plurality of partial areas which are disposed on a display area of the display are associated with priority information indicating priority of each of the partial areas; a adjusting unit configured to receive information specifying one of data to be displayed from one of the mobile terminal devices, acquire the one of data to be displayed based on the information and adjust the display area by allocating the one of the data to one of the partial areas based on the priority information included in the partial area information;

and a display control unit configured to display the one of the data allocated to the one of the partial areas on the display based on the disposition information included in the partial area information.

According to a fourth aspect of at least one embodiment of the present invention, there is provided a display device designed to be mounted on a vehicle, the display device comprising: a display including a first partial area and a second partial area which are positionally fixed, a controller configured to control the display, wherein: when receiving a first image, the controller controls the display to display the first image on the first partial area; when receiving a second image during the first image is displayed on the first partial area, the controller controls the display to display the second image on the second partial area; and when receiving a third image during the first and second images are displayed on the first and second partial areas, respectively, the controller controls the display to display the third image on the first partial area and the first image on the second partial area.

According to the invention, it is possible to avoid deterioration in visibility caused by overlapping the windows corresponding to the screen data with one another. Therefore, it is possible to provide the plurality of screen data for the passenger to grasp the screen data easily in the type suitable for the in-vehicle circumstances in which it is difficult to operate the screen due to vibration or the like and it is necessary to grasp immediately the information displayed on the display. In addition, it is possible to control the display position of the screen data by the mobile terminal device carried by the passenger.

BRIEF DESCRIPTION OF THE DRAWINGS

The above objects and advantages of the present invention will become more apparent by describing in detail preferred exemplary embodiments thereof with reference to the accompanying drawings, wherein:

FIG. 3 is a diagram illustrating an example of partial area information;

FIG. 5 is a diagram for explaining movement of screen data;

FIG. 6 is a diagram for explaining conversion of partial area information;

DETAILED DESCRIPTION OF THE EMBODIMENTS

Embodiments of the invention will be described with reference to the accompanying drawings. The scope of the invention is not limited to these embodiments and includes the scope of the appended patent claims and their equivalents. A screen control system including the in-vehicle device and mobile terminal device will be described.

[Embodiment 1]

Figure 1:
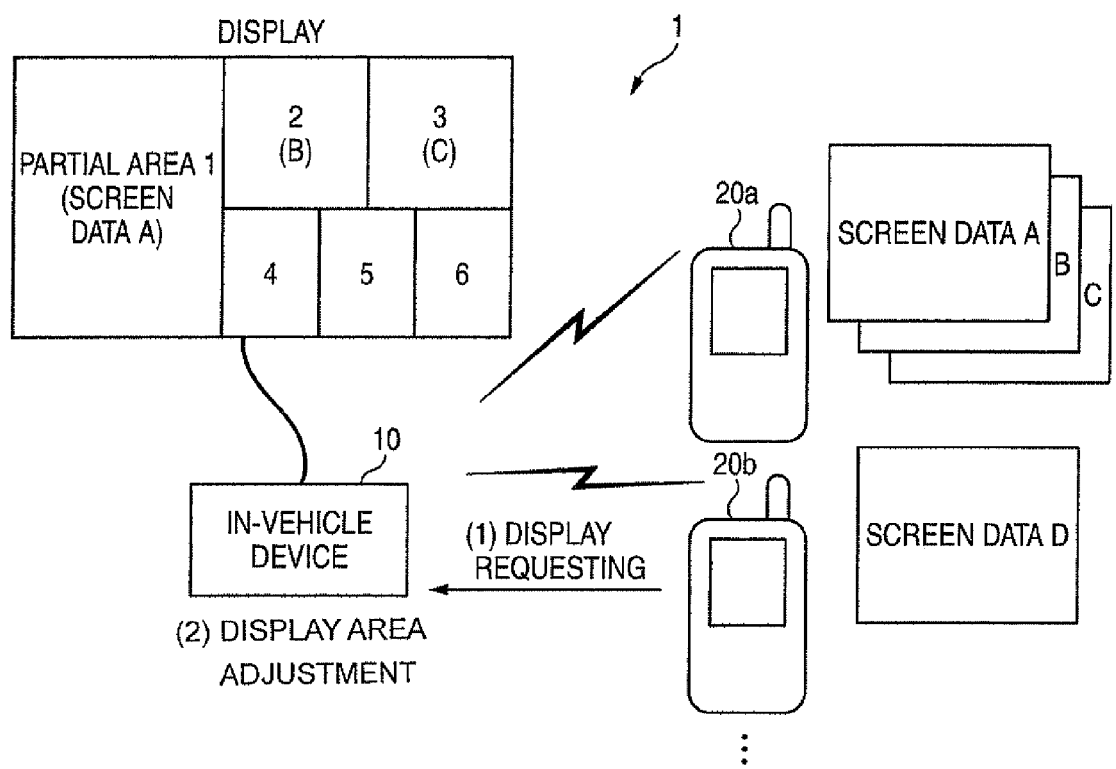
FIG. 1 is a diagram illustrating an outline of a screen control system according to Embodiment 1.

FIG. 1 is a diagram illustrating an outline of a display control system according to the invention. As shown in FIG. 1, a screen control system 1 according to the embodiment includes an in-vehicle device 10 provided with a display, and a plurality of mobile terminal devices 20 carried by a passenger. In FIG. 1, to distinguish the plurality of mobile terminal devices 20, reference numerals 20a and 20b are given to the mobile terminal devices 20.

As shown in FIG. 1, in the display, partial areas 1 to 6 are set to define a display area of the display. That is, the partial areas for displaying screen data are preset, unlike a type (hereinafter, referred to as "multi-window type") displaying a plurality of superimposed windows and freely changing the positions and display order of the windows.

Priority indicating correspondence order of the screen data is set for each of the partial areas. For example, the partial area with highest priority is a partial area 1, and the partial area with lowest priority is a partial area 6. The screen data corresponding to the first display request is displayed in the partial area 1, and the screen data corresponding to the second display request is displayed in the partial area 2.

As shown in FIG. 1, an application program built into the mobile terminal device 20a transmits the screen data A to C to the in-vehicle device 10, the screen data A, the screen data B, and the screen data C are associated with the partial area 1, the partial area 2, and the partial area 3, respectively, and are displayed on the display. In this case, when the mobile terminal device 20b requests the in-vehicle device 10 to display the screen data D (see (1) of FIG. 1), the in-vehicle device 10 adjusts to associate and display the screen data D with and on which partial area (see (2) of FIG. 1).

Specifically, when a display request to display the screen data D on the partial area 1 is received from the mobile terminal device 20b, the screen data D is associated with the partial area 1, and the screen data A, the screen data B, and the screen data C are shifted (slid) to and associated with the partial area 2, the partial area 3, and the partial area 4, respectively. In the screen control system 1 according to the embodiment, the association between the partial areas and the screen data may be fixed, which will be described later with reference to FIG. 4 and the like.

As described above, in the screen control system 1 according to the embodiment, the plurality of partial areas to which the priority indicating the correspondence order of the screen data is set are prepared in advance, and the screen data is assigned to the partial areas. Accordingly, it is possible to arrange and display the screen data. Therefore, there is no case where the screen data is hidden under another window and is not shown like the multi-window type. In addition, the partial areas are fixed at a predetermined position on the display, and thus it is possible to find out easily a movement destination even when the display area of the other screen data is changed by displaying new screen data.

In the embodiment, the case of filling the display area of the display with the partial areas, that is, the case where the partial areas are not overlapped with one another has been described, but the partial areas may be set to be overlapped with one another within the range where peripheral parts of the partial areas do not disrupt visibility.

Figure 2:
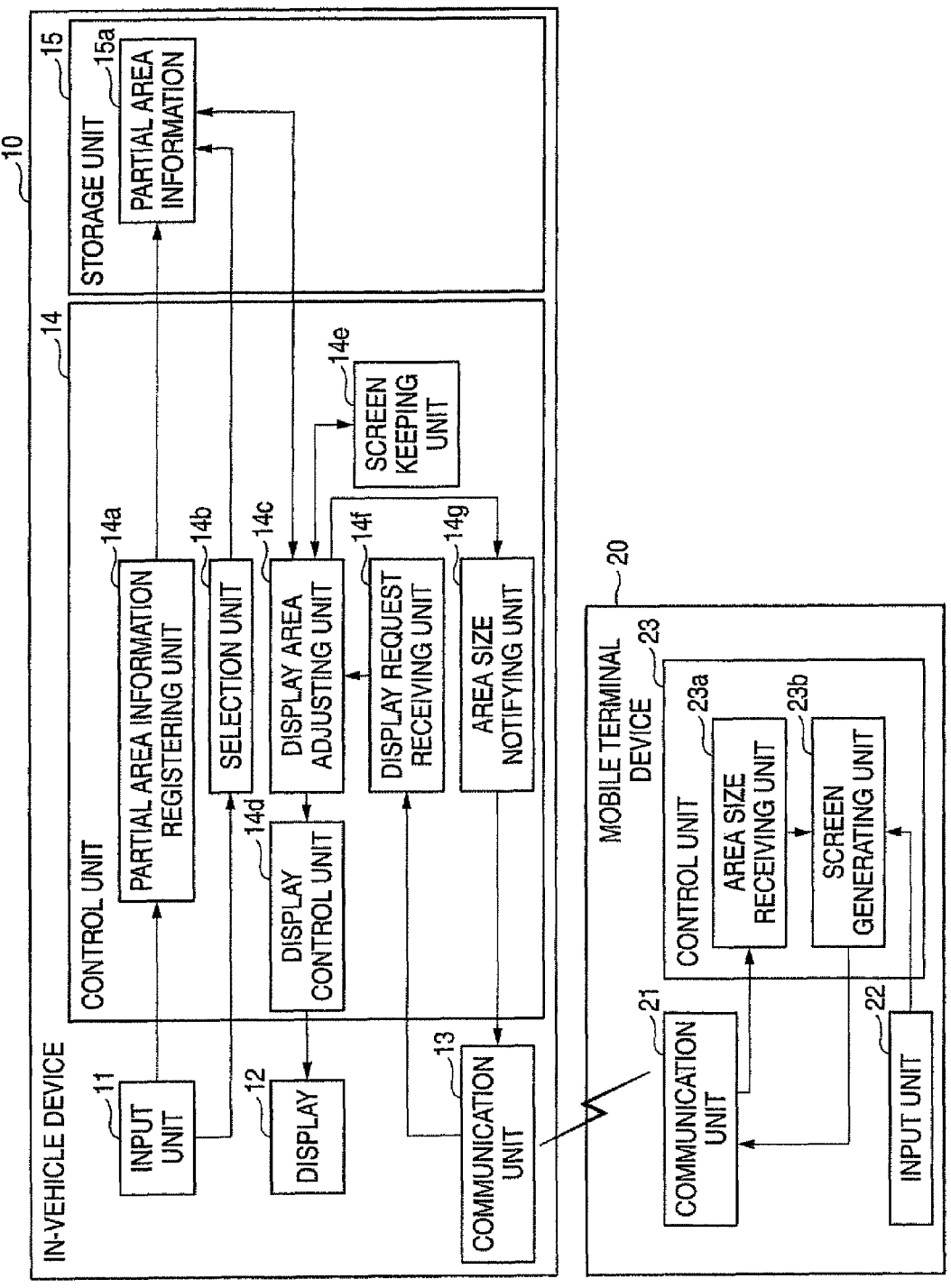
FIG. 2 is a diagram illustrating a configuration of an in-vehicle device and a mobile terminal device.

Next, configurations of the in-vehicle device 10 and the mobile terminal device 20 constituting the screen control system 1 will be described with reference to FIG. 2. In FIG. 2, one mobile terminal device 20 is shown, but the number of mobile terminal devices 20 may be modified.

As shown in FIG. 2, the in-vehicle device 10 is provided with an input unit 11, a display 12, a communication unit 13, a control unit 14, and a storage unit 15. The control unit 14 is provided with a partial area information registering unit 14a, a selection unit 14b, a display area adjusting unit 14c, a display request receiving unit 14f, and an area size notifying unit 14g. The storage unit 15 stores partial area information 15a. In FIG. 2, only constituent elements necessary to describe characteristics of the screen control system 1 according to the invention are shown.

The input unit 11 is an input device such as a button and a dial for inputting setting information for the partial areas set on the display area of the display. The input unit 11 outputs the input information to a partial area information registering unit 14a and a selection unit 14b of the control unit 14. The display 12 is a display device such as a liquid crystal display, and displays the screen data at the display position adjusted by the display area adjusting unit 14c.

The communication unit 13 communicates with the mobile terminal devices 20 by wireless. The communication unit 13 transmits and receives data to and from the mobile terminal devices 20 in two ways on the basis of the communication standard of, for example, Bluetooth (registered trademark). In the embodiment, the case of performing the wireless communication between the in-vehicle device 10 and the mobile terminal devices 20 is described, but the communication may be performed by wire.

The control unit 14 adjusts the display area of the screen data generated by the mobile terminal devices 20 on the basis of the partial area information 15a stored in the storage unit 15, and outputs the adjusted screen data to the display 12. Hereinafter, an example of the partial area information 15a will be described with reference to FIG. 3. FIG. 3 is a diagram illustrating an example of the partial area information 15a.

As shown in FIG. 3, the partial area information 15a includes items such as "area name" for identifying, for example, rectangular partial area, "position" indicating positions of the partial areas, "size" indicating sizes of the partial areas, "priority" indicating assignment order of the screen data for the partial areas, "screen name" for identifying the screen data, and "fixed/non-fixed" indicating whether or not the association between the screen data and the partial areas is fixed.

As shown in FIG. 3, identifiers and the like are set in "area name", coordinates of several corners of the partial areas (rectangular areas) with respect to display coordinates of the display 12, or center coordinates of the partial areas are set in "position", and numerals indicating the assignment order of the screen data are set in "priority". Identifiers for identifying the screen data which is being assigned are set in "screen name". In "fixed/non-fixed", "Yes" is set when the association between the screen data and the partial areas is fixed and "No" is set when the association is not fixed by the display area adjusting unit 14c.

As shown in FIG. 3, for example, the priority of the partial area having an area name of "area 1" is "1" and the priority of the partial area having an area name of "area 2" is "2", and thus the partial area where the first screen data is displayed becomes "area 1". In "area 1", "screen A" is displayed and "fixed/non-fixed" is "No", and thus new screen data can be associated with "area 1".

When the new screen data is assigned to "area 1", the old screen data can be shifted (slid) to another partial area. However, "fixed/non-fixed" of "area 2" is "Yes", and thus "screen B" displayed in "area 2" is displayed as it is. The old screen data of "area 1" is displayed in another partial area.

The partial area information registering unit 14a receives the partial area information 15a input through the input unit 11, and registers the received partial area information 15a in the storage unit 15. The selection unit 14b selects the partial area information 15a used by the display area adjusting unit 14c on the basis of the operation of a passenger input through the input unit 11 when the plurality of partial area information 15a is registered in the storage unit 15.

The display area adjusting unit 14c assigns the screen data included in the display request received from the display request receiving unit 14f on the basis of the partial area information 15a stored in the storage unit 15, and transmits the screen data to the display control unit 14d. In addition, the display area adjusting unit 14c performs a process of updating the partial area information 15a about whether or not the screen name of the screen data assigned to the partial areas and the screen are fixed to the partial areas. The display area adjusting unit 14c also performs a process of transmitting the size of the new partial area to the area size notifying unit 14g on the basis of the partial area information 15a with respect to the screen data to which the partial area is newly assigned.

Figure 4:
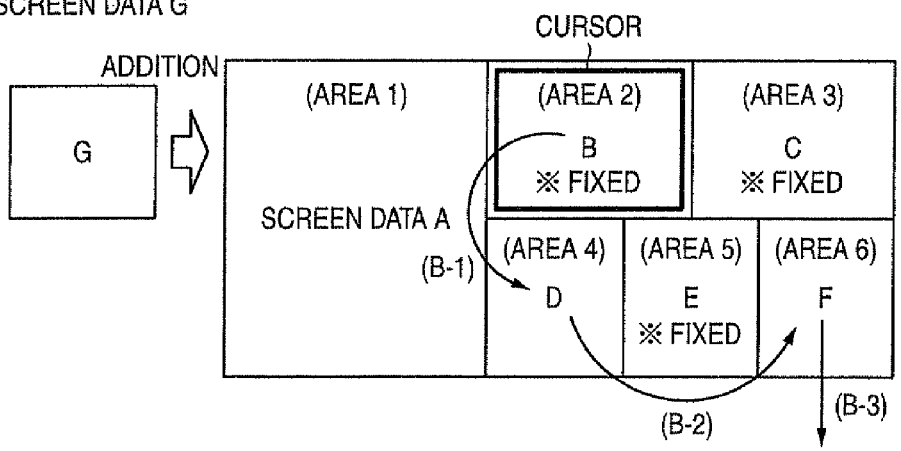
FIG. 4 is a diagram for explaining addition of screen data.

Hereinafter, the adjustment process perfouned by the display area adjusting unit 14c will be described with reference to FIG. 4 and FIG. 5. FIG. 4 is a diagram for explaining addition of the screen data, and FIG. 5 is a diagram for explaining movement of the screen data. In FIG. 4 and FIG. 5, "priority" of the partial areas is "area 1, area 2, area 3, area 4, area 5, and area 6" in order of high priority. The item of "fixed/non-fixed" shown in FIG. 3 for the partial areas with description of "*fixed" is "Yes", and the same item for the partial areas with no specific description is "No".

In FIG. 4, the adjustment process at the time of receiving a display request to add and display "screen data G" is shown when the screen data A to F are assigned to area 1 to area 6, respectively. As shown in (A) before addition of FIG. 4, the screen data has been already assigned to all the partial areas, and the screen data B displayed in the area 2, the screen data C displayed in the area 3, and the screen data E displayed in the area 5 are set to fix the association relation.

As shown in "(B) request for addition of screen data G" of FIG. 4, in the case of wanting to display the new screen data G, an application program corresponding to the screen data G is executed on the mobile terminal device 20, and "cursor" shown in FIG. 4 is moved to the partial area desired for displaying the screen data G by operating the input unit 22 of the mobile terminal device 20 or the input unit 11 of the in-vehicle device 10. A default position of "cursor" is, for example, "area 1", and the passenger moves "cursor" displayed at the default position to the desired partial area (area 2 in FIG. 4).

In this case, the screen data B has already been displayed in the area 2 desired for displaying the screen data G, the association between the screen data B and the area 2 is set to be fixed. For this reason, a message for confirming whether or not to release the fixed association is displayed on the display 12 or a display (not shown) of the mobile terminal device 20. In addition, the confirmation message is displayed on a device which the passenger is operating.

When receiving a response that the fixed association for the screen data B may be released, a display place for the screen data G becomes the area 2, and then a message for confirming whether or not to fix the association relation between the screen data G and the area 2 is displayed on the display 12 or the display (not shown) of the mobile terminal device 20. The partial area information 15a is updated according to the setting of fixed/non-fixed.

When receiving a response that the fixed association for the screen data B is not released, a message for promoting reselection of another partial area is displayed on several displays. The messages are displayed on a device which the passenger is operating.

When the response that the fixed association for the screen data B may be released is received and the display place for the screen data G becomes the area 2, a sliding process of the screen data shown in (B-1) to (B-3) of FIG. 4 is subsequently performed.

Such a sliding process is performed from the partial area with high priority to the partial area with low priority, except for the partial area where the fixed association is performed. That is, as a movement destination candidate for the screen data B in which the fixation is released, there are the area 4 and the area 6 where the fixation is not set, the priority of the area 4 is higher than that of the area 6, and thus the movement destination for the screen data B becomes the area 4 (see "B-1" in FIG. 4). A movement candidate for the screen data D displayed on the area 4 is just the area 6 where the fixation is not set, and thus the area 6 becomes the movement destination (see "B-2" in FIG. 4).

Since there is no movement destination for the screen data F displayed in the area 6, the screen data F loses the display place. However, an imaginary display place for the screen data F is set to, for example, the area 7. When the screen data corresponding to the areas 1 to 6 are decreased later, the screen data F associated with the area 7 is brought forward and displayed.

The result of the sliding process is shown in "(C) after addition" of FIG. 4. As shown in "(C) after addition", the newly added screen data G is assigned to the area 2, the assignment places for the old screen data B and screen data D are changed to the area 4 and the area 6, respectively. The association relation between the newly added screen data G and the area 2 is set to be non-fixed.

The display of the message for confirming whether or not the fixed association may be released at the time of displaying the screen data G in the area 2 where the association with the screen data B is fixed has been described. However, the fixation may be released by a predetermined operation instead of the display of the confirmation message. For example, the fixation may be released by a continuous operation of a predetermined operation key in the input unit 22 of the mobile terminal device 20.

Next, the movement of screen data will be described with reference to FIG. 5, and FIG. 5 is an example of a case of changing a display position of the screen data which has been already assigned to the partial area. A case of changing an assignment place for the screen data D from the area 4 to the area 2 is described.

As shown in "(A) selection of movement source" of FIG. 5, a movement source is selected by movement of a cursor operated by a passenger. Subsequently, as shown in "(B) selection of movement destination", a movement destination is selected by movement of the same cursor.

The screen data B has already been displayed in the area 2 desired to display the screen data D, and the association between the screen data B and the area 2 is set to be fixed. For this reason, a message for confirming whether or not the fixed association may be released is displayed on the display 12 or the display (not shown) of the mobile terminal device 20. The confirmation message is displayed on a device which the passenger is operating.

When receiving a response that the fixed association may be released, a display place for the screen data D becomes the area 2, and a message for confirming whether or not to fix the association relation between the screen data D and the area 2 is displayed on the display 12 or the display (not shown) of the mobile terminal device 20. The partial area information 15a is updated according to the fixed/non-fixed setting.

When receiving a response that the fixed association is not released, a message for prompting reselection of the other partial area as the movement destination is displayed on any one display. The messages are displayed on a device which the passenger is operating.

Subsequently, a sliding process of the screen data is performed to determine a new display place for the screen data B losing the display place. Such a sliding process is performed from the partial area with high priority to the partial area with low priority, except for the partial area where the fixed association is performed. That is, as a movement destination candidate for the screen data B in which the fixation is released, there are the area 4 and the area 6 where the fixation is not set, the priority of the area 4 is higher than that of the area 6, and thus the movement destination for the screen data B becomes the area 4.

The result of the sliding process is shown in "(C) after movement" of FIG. 5. As shown in "(C) after movement", the screen data G with the changed display place is assigned to the area 2, the area 4 becomes a new assignment place for the old screen data B. The association relation between the screen data D and the area 2 is set to be non-fixed.

Returning to the description of FIG. 2, the display control unit 14d will be described. The display control unit 14d controls the display 12 to display the screen data associated with the partial areas by the display area adjusting unit 14c on the basis of the positions and sizes of the partial areas included in the partial area information 15a.

A screen keeping unit 14e keeps the screen data losing the corresponding partial area as a result of the adjustment performed by the display area adjusting unit 14c. The screen data kept by the screen keeping unit 14e is associated with any one partial area by the display area adjusting unit 14c when an empty place occurs in the partial areas. The screen keeping unit 14e may keep the screen data in the storage unit 15.

The display request receiving unit 14f transfers the display request received from the mobile terminal device 20 through the communication unit 13, to the display area adjusting unit 14c. The area size notifying unit 14g notifies the size of the new partial area received from the display area adjusting unit 14c, to the mobile terminal device 20 through the communication unit 13.

The storage unit 15 is formed by a storage device such as a HDD (Hard Disk Drive) and a RAM (Random Access Memory), and stores the partial area information 15a. As described above with reference to FIG. 3, the partial area information 15a includes the positions and sizes of the partial areas, the priority indicating the assignment order of the associated screen data, and the like.

In FIG. 4 and FIG. 5, one of partial area information 15a is shown. As described above, however, a plurality of partial area information 15a may be prepared to convert the partial area information 15a according to the display number of screen data. In the embodiment, the case of setting the partial area information 15a through the input unit 11 of the in-vehicle device 10 is described, but the partial area information 15a may be received from the mobile terminal device 20.

FIG. 6 is a diagram for explaining the conversion of the partial area information 15a. In (A) and (B) shown in FIG. 6, the partial area information 15a in which the number of partial areas is 2 is used. In (C) shown in FIG. 6, the partial area information 15*a* in which the number of partial areas is 3 is used. In (D) shown in FIG. 6, the partial area information 15*a* in which the number of partial areas is 6 is used.

As shown in (A) of FIG. 6, when the display number of screen data is 1, the area 1 becomes the display place for the screen data and a navigation screen (car navigation screen) is associated with another area. When the display number of screen data becomes 2 by newly receiving a display request, the area 2 assigned to the navigation screen becomes the display place for the screen data.

When the display number becomes 3, the partial area information 15*a* is converted and a layout is formed as shown in (C) of FIG. 6. When the display number is increased, the partial area information 15*a* is converted and a layout is formed as shown in (D) of FIG. 6. In FIG. 6, the maximum 6 partial areas are shown, but the number of partial areas is not limited. The partial areas are not necessarily rectangular, and may be formed in a shape so as not to overlap the partial areas with one another.

In FIG. 6, the case of automatically converting the partial area information 15*a* according to the number of screen data has been described, but the used partial area information 15*a* may be allowed to be selected by the passenger. In this case, selection items indicating an outline of the partial area information 15*a* are displayed on the display 12 of the in-vehicle device 10 or the display (not shown) of the mobile terminal device 20, and a selection result is input from the input unit 11 of the in-vehicle device 10 or the input unit 22 of the mobile terminal device 20.

Returning to the description of FIG. 2, the mobile terminal device 20 will be described. The mobile terminal device 20 is a mobile terminal device such as a mobile phone having an application program built therein. The mobile terminal device 20 is provided with a communication unit 21, an input unit 22, and a control unit 23. The control unit 23 is provided with an area size receiving unit 23*a*, and a screen generating unit 23*b*. In FIG. 2, only constituent elements necessary for explaining characteristics of the screen control system 1 according to the invention are shown.

The communication unit 21 communicates with the in-vehicle device 10 by wireless. The communication unit 21 transmits and receives data to and from the in-vehicle device 10 in two ways on the basis of the communication standard of, for example, Bluetooth (registered trademark). In the embodiment, the case of performing the wireless communication between the in-vehicle device 10 and the mobile terminal devices 20 is described, but the communication may be performed by wire.

The input unit 22 is an input device formed by operation buttons, a cursor key, and the like, and performs a process of transferring an input from the passenger, to the screen generating unit 23*b* or the like. In the embodiment, the case of performing an operation to designate the display place or the like for the screen data through the input unit 22 of the mobile terminal device 20 is mainly described, but such an operation may be performed through the input unit 11 of the in-vehicle device 10.

The control unit 23 generates the screen data displayed on the display 12 of the in-vehicle device 10, and changes the size of the screen data according to the area size notified from the in-vehicle device 10. The area size receiving unit 23*a* receives the area size notified from the in-vehicle device 10 through the communication unit 21, and transfers the area size to the screen generating unit 23*b*.

The screen generating unit 23*b* corresponds to the application program, generates the screen data according to the area size transmitted from the area size receiving unit 23*a*. In addition, the screen generating unit 23*b* transmits the display request including the generated screen data to the in-vehicle device 10 through the communication unit 21.

Figure 7:
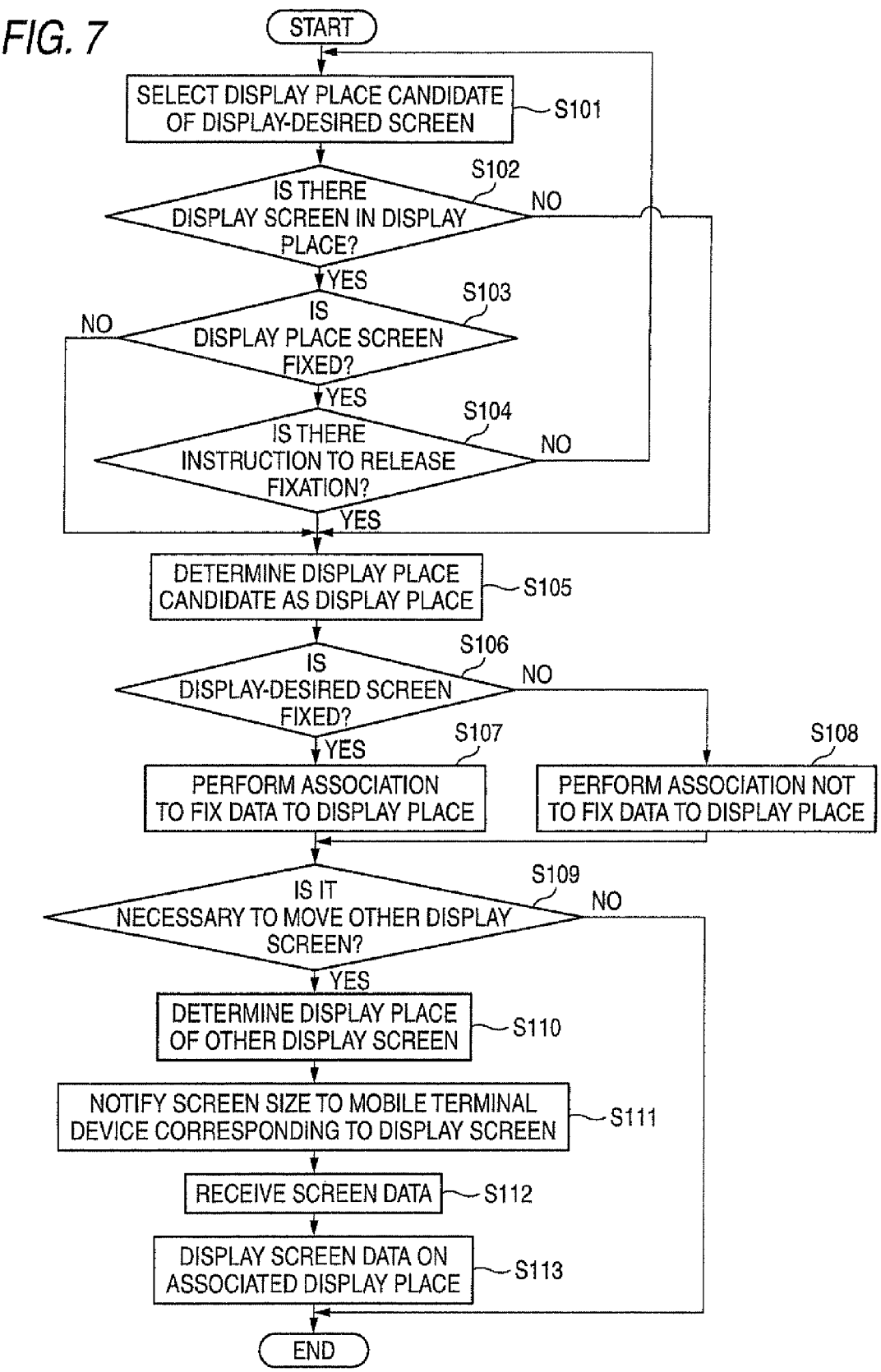
FIG. 7 is a flowchart illustrating the flow of a process flow performed by the in-vehicle device.

Next, a flow of a process performed by the in-vehicle device 10 will be described with reference to FIG. 7. FIG. 7 is a flowchart illustrating the flow of a process performed by the in-vehicle device 10. As shown in FIG. 7, when a display place candidate for a display-desired screen is selected by an operation of a passenger (Step S101), it is determined whether or not there is a display screen in a display place (partial area) as the candidate (Step S102). When there is a display screen in the display place (Step S102: Yes), it is determined whether or not the position of the display place screen is fixed (Step S103).

When the position of the display place screen is fixed (Step S103: Yes), it is determined whether or not the fixation may be released. When the fixation is instructed to be released (Step S104: Yes), the display place candidate is determined as the display place (Step S105). Meanwhile, when the fixation is not instructed to be released (Step S104: No), the processes after Step S101 are repeated.

When the determination condition of Step S102 is not satisfied (Step S102: No), the process of Step S105 is performed without performing the processes of Step S103 and Step S104. When the determination condition of Step S103 is not satisfied (Step S103: No), the process of Step S105 is performed without performing the process of Step S104.

Following Step S105, it is determined whether or not the position of the display-desired screen is fixed (Step S106). The determination whether or not the position is fixed is performed in response to the confirmation message or on the basis of whether or not a specific operation is performed. When the position of the display-desired screen is fixed (Step S106: Yes), association is performed to fix the screen data to the display place (Step S107). Meanwhile, when the position of the display-desired screen is not fixed (Step S106: No), association is performed not to fix the screen data to the display place (Step S108).

Subsequently, it is determined whether or not it is necessary to move the display places for the other display screens due to the display of the display-desired screen (Step S109). When it is necessary to move the display places of the other display screens (Step S109: Yes), the display places for the other display screens are determined (Step S110). When the sizes of the partial areas become different due to the change of the display places, the screen sizes are notified to the mobile terminal devices 20 corresponding to the display screens (Step S111). When receiving the screen data (Step S112), the screen data is displayed in the associated display place (Step S113) and then the process is ended. When the determination condition of Step S109 is not satisfied (Step S109: No), the process is ended without performing the processes of Step S110 to Step S113.

As described above, according to the embodiment, the in-vehicle device is configured to store the disposition information about the plurality of partial areas disposed on the display area of the display and the partial area information about the priority indicating the correspondence order of the screen data, to associate the screen data with any one of the partial areas on the basis of the priority included in the partial area information when the display request to display the screen data on the display is received, and to display the screen data associated with the partial area on the display on the basis of the dispositional information included in the partial area information. In addition, the mobile terminal device is configured to designate the partial area desired to display the generated screen data.

Accordingly, it is possible to avoid deterioration in visibility caused by overlapping the windows corresponding to the screen data with one another. Therefore, it is possible to provide the plurality of screen data for the passenger to grasp the screen data easily in the type suitable for the in-vehicle circumstance in which it is difficult to operate the screen due to vibration or the like and it is necessary to grasp immediately the information displayed on the display.

In the embodiment, the case of displaying the screen data generated by the mobile terminal device on the display of the in-vehicle device has been described, but the screen data generated by the in-vehicle device may be controlled to be displayed in the same manner as the case of the screen data generated by the mobile terminal device.

In the embodiment, the case of notifying the sizes of the partial areas from the in-vehicle devices to the mobile terminal devices and associating the display sizes of the screen data with the sizes of the partial areas on the mobile terminal side has been described, but resolution of the corresponding partial area may be notified instead of the notification of the sizes or together with the notification of the sizes. In addition, the sizes of the screen data received from the mobile terminal devices may be enlarged or reduced appropriately for the sizes of the partial areas without notifying the sizes or the like of the partial areas from the in-vehicle device to the mobile terminal devices.

[Embodiment 2]

In Embodiment 1, the example of receiving the data generated by the mobile terminal device and displaying the data on the display has been described, but the invention is not limited thereto. For example, URL or the like is received from the mobile terminal device, data is acquired by the in-vehicle device, and the data is displayed on the display.

In Embodiment 2, an example of receiving data information specifying data displayed on the display from the mobile terminal device, acquiring the data specified by the data information, adjusting the display area, and displaying the data on the display will be described with reference to FIG. 8 to FIG. 11.

(Outline of In-Vehicle Device According to Embodiment 2)

Figure 8:
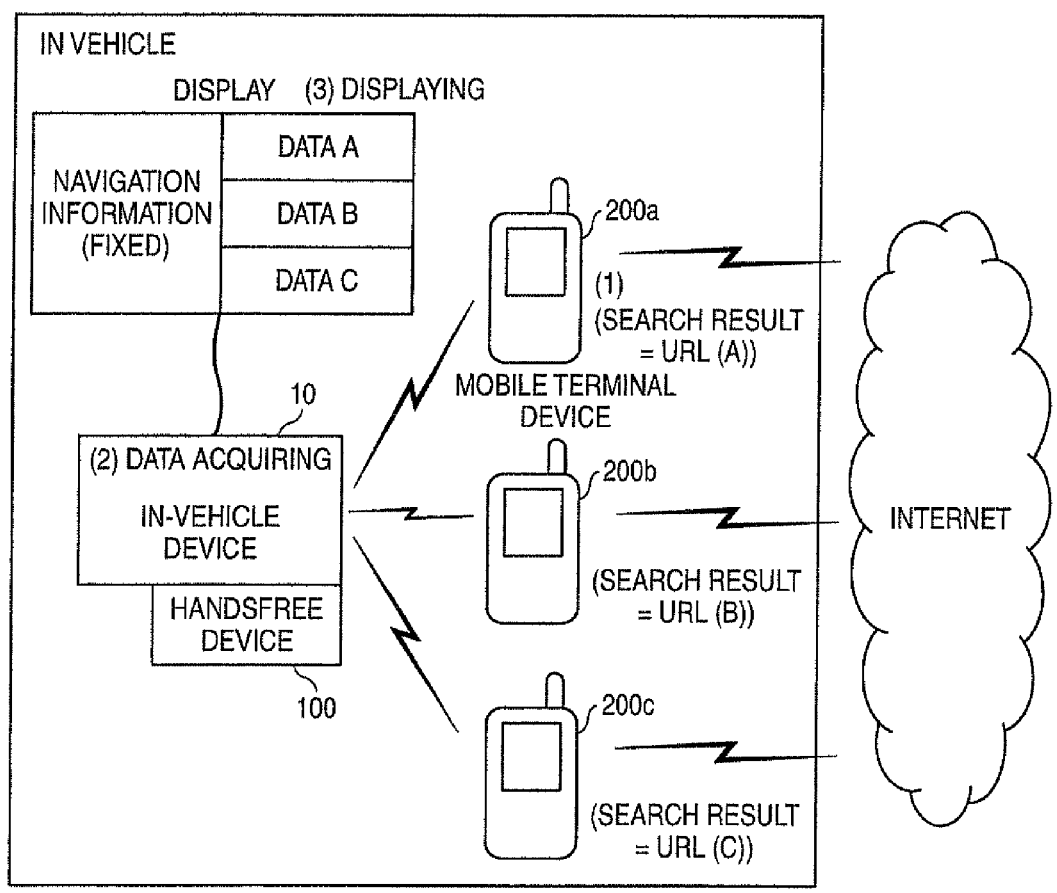
FIG. 8 is diagram illustrating an outline of an in-vehicle device according to Embodiment 2.

First, an outline of an in-vehicle device according to Embodiment 2 will be described with reference to FIG. 8. FIG. 8 is a diagram for explaining the outline of the in-vehicle device according to Embodiment 2.

As shown in FIG. 8, in a vehicle needing a screen display system, the in-vehicle device 10 according to Embodiment 2, a handsfree device 100 having an earphone and microphone capable of operating the in-vehicle device without using the passenger's hands, and mobile terminal devices 200a to 200c carried by passengers in the vehicle are connected to each other by wireless communication such as Bluetooth.

In such a configuration, the passengers in the vehicle search, for example, for restaurants around a destination using the mobile terminal devices simultaneously and the searches are completed in the order of the mobile terminal device 200a, the mobile terminal device 200b, and the mobile terminal device 200c.

In this case, the mobile terminal device 200a accesses the internet and searches the restaurants in a search site or the like by an operation of a user, and acquires "URL (A)" (see (1) of FIG. 8). URL is "Uniform Resource Locator" indicating a technical way of indicating a location of an information resource (documents, images, etc.) on the internet.

The mobile terminal device 200a transmits the data information "URL (A)" to the in-vehicle device 10, and the in-vehicle device 10 accesses "URL (A)" and acquires restaurant information "data A" (see (2) of FIG. 8).

Subsequently, the in-vehicle device 10 displays the acquired "data A" on the right screen of the display which has the left screen as a fixed screen of navigation information (see (3) of FIG. 8). The display adjusting method of displaying the data on the display and the like by the in-vehicle device 10 is performed in the same manner as that of Embodiment 1, and thus the detailed description is omitted.

Then, similarly, the in-vehicle device 10 receiving "URL (B)" and "URL (C)" in the order of the mobile terminal device 200b and the mobile terminal device 200c which complete the internet search accesses to "URL (B)" and "URL (C)" in order thereof and acquires restaurant information "data B" and "data C", and displays the restaurant information "data B" and "data C" on the left screen of the display.

With such a configuration, it is possible to search information using the plurality of mobile terminal devices carried in the vehicle at the same time, and to share the information easily by displaying the information acquired by the mobile terminal devices on the display.

(Configuration of In-Vehicle Device According to Embodiment 2)

Figure 9:
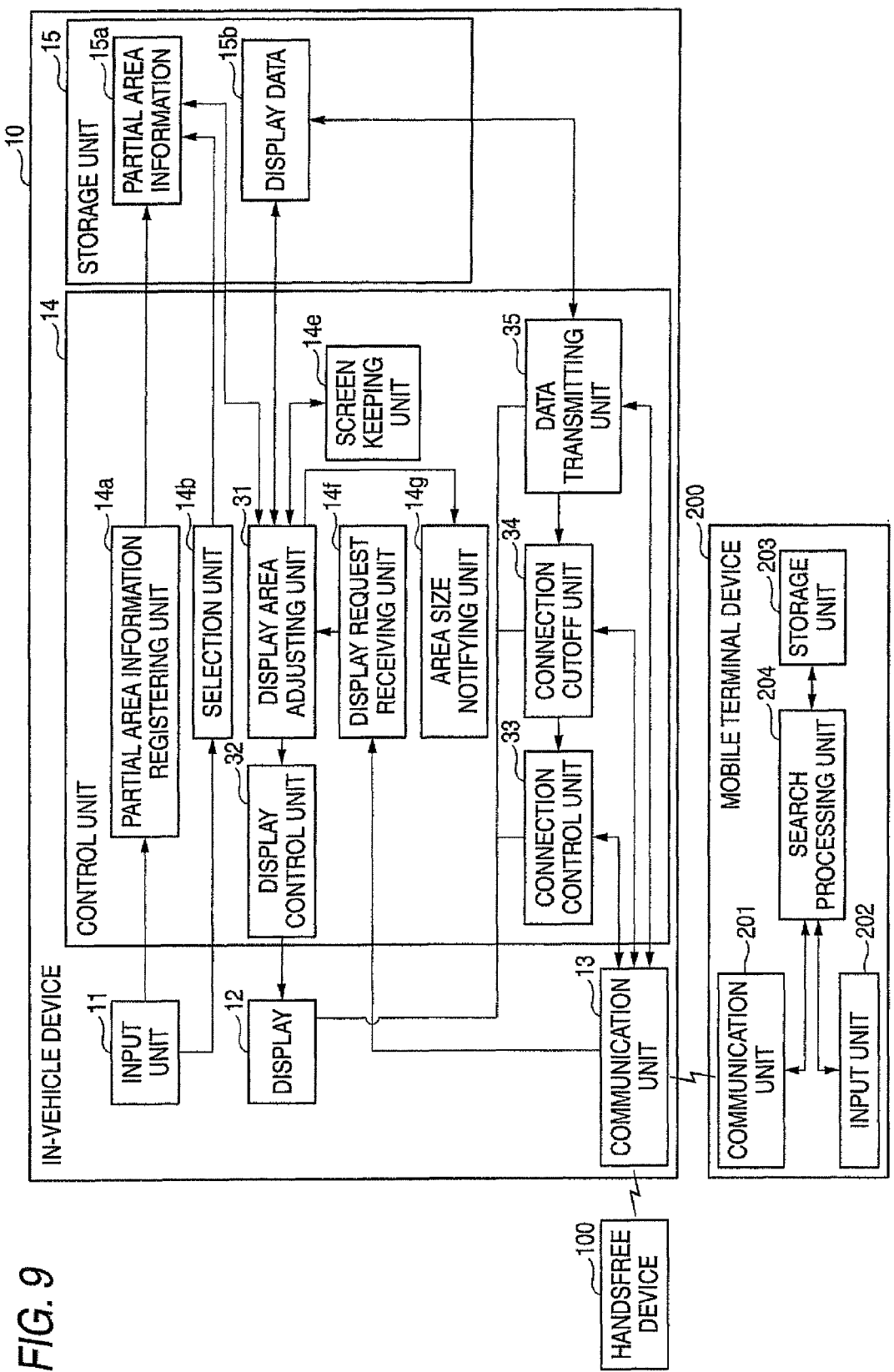
FIG. 9 is a block diagram illustrating configuration of a screen display system including the in-vehicle device according to Embodiment 2.

Next, a confirmation of the in-vehicle device according to Embodiment 2 will be described with reference to FIG. 9. FIG. 9 is a block diagram illustrating a configuration of a screen display system including the in-vehicle device according to Embodiment 2.

As shown in FIG. 9, the screen display system is provided with the in-vehicle device 10, the handsfree device 100, and the mobile terminal device 200. The mobile terminal device 200 has the same configuration as that of the mobile terminal devices 200a to 200c, corresponding to the mobile terminal devices 200a to 200c described with reference to FIG. 1, which will be described herein as the mobile terminal device 200. The handsfree device 100 has the same configuration as that of the mobile terminal devices 200a to 200c, and thus the detailed description is omitted herein.

A pairing process is performed between the in-vehicle device 10 and the handsfree device 100 and between the in-vehicle device 10 and the mobile terminal device 200 to establish connection, and thus it is possible to recognize that the connection to whatever device is established. For example, the in-vehicle device 10 may store the mobile terminal device 200 and a user name of the mobile terminal device associated with each other.

(Configuration of In-Vehicle Device 10)

As shown in FIG. 9, the in-vehicle device 10 is provided with an input unit 11, a display 12, a communication unit 13, a control unit 14, and a storage unit 15. The input unit 11, the display unit 12, the communication unit 13, the partial area information registering unit 14a, the selection unit 14b, the screen keeping unit 14e, the display request receiving unit 14f, and the area size notifying unit 14g of the control unit 14, and the partial area 15a of the storage unit 15 have the same functions as those described with reference to FIG. 2, and thus the detailed description is omitted herein.

The storage unit 15 stores display data 15b that is data displayed on the display 12 in the past by the display control unit 32. For example, the display data 15b is image data displayed on the display 12, music data, map data, text data, or cache data such as home pages of the interne.

When data information specifying the data displayed on the display 12 is received from the mobile terminal device 200, the display area adjusting unit 31 of the control unit 14 acquires the data specified by the data information and associates the data with any one of the partial areas on the basis of priority included in the partial area information, thereby adjusting the display area.

Specifically, the display area adjusting unit 31 receives a URL transmitted from the mobile terminal device 200 through the communication unit 13, accesses the received URL, and acquires data through a network such as the internet. The display area adjusting unit 31 assigns the data included in the display request received from the display request receiving unit 141 to the partial areas on the basis of the partial area information 15*a* stored in the storage unit 15, and transfers the data to the display control unit 32 together with the information of the mobile terminal device transmitting the URL. The adjustment process performed by the display area adjusting unit 31 is the same as that of Embodiment 1, and thus the detailed description is omitted herein.

In addition, the display area adjusting unit 31 acquires data designated by an instruction operation of a user from the display data 15*b* stored in the storage unit 15, and associates the data with any one of the partial areas on the basis of the priority included in the partial area information, thereby adjusting the display area. Specifically, the display area adjusting unit 31 displays a list of the display data 15*b* stored in the storage unit 15 on the display 12 when a user (passenger) or the like operates the input unit 11 or the display 12 to search cache data. When the desired display data is selected from the displayed list of the display data 15*b* by the user (e.g., selected by a cursor, a touch panel, or the like), the display area adjusting unit 31 acquires the selected display data from the display data 15*b* and associates the data with any one of partial areas on the basis of the priority included in the partial area information, thereby adjusting the display area.

The display control unit 32 of the control unit 14 displays the data associated with the partial area on the display 12 on the basis of the disposition information included in the partial area information. Specifically, the display control unit 32 performs a process of displaying the data associated with the partial area by the display area adjusting unit 31 on the display 12 on the basis of the positions and sizes of the partial areas included in the partial area information 15*a*. The display control unit 32 displays the data acquired by the display area adjusting unit 31 on the display 12, and stores the data as the display data 15*b* in the storage unit 15.

When the display control unit 32 displays the data on the display 12, the display control unit 32 also displays information specifying the mobile terminal device 200 transmitting the data information specifying the data on the display 12. Specifically, the display control unit 32 displays the mobile terminal device 200 transmitting the URL of the data on the right upside or the like of the partial area on the display 12 displaying the data. For example, the display control unit 32 may acquire a user name of the mobile terminal device and display the acquired user name on the basis of the information of the mobile terminal device acquired from the display area adjusting unit 31 and the pairing process performed in advance.

The connection control unit 33 permits or refuses connection to the other mobile terminal devices on the basis of a predetermined condition when the connection control unit 33 receives a connection request from the other mobile terminal devices different from a plurality of already connected mobile terminal devices. Specifically, when the connection control unit 33 receives a link request (connection request) from the other mobile terminal device different from the already connected mobile terminal device 200 (mobile terminal devices 200*a* to 200*c* in FIG. 8), the connection control unit 33 outputs an image message or a sound message for asking the user (passenger) whether to permit or refuse the connection to the display 12, a speaker (not shown), or the like, to allow the user to select permission or refusal. When the user selects the permission for connection, the connection control unit 33 performs the pairing process with a new mobile terminal device to establish a new connection. When the user selects the refusal for connection, the connection control unit 33 refuses the connection to the new mobile terminal device.

The connection control unit 33 predetermines the number (e.g., 5) of mobile terminal devices connectable to the in-vehicle device 10. At the time of receiving a connection request from new mobile terminal devices, the connection control unit 33 may permit the connection to the new mobile terminal devices when it is within the predetermined number, and the connection control unit 33 may refuse the connection when it is over the predetermined number.

The connection cutoff unit 34 cuts off the connection to the already connected mobile terminal device on the basis of a predetermined condition. Specifically, when the connection cutoff unit 34 receives a cutoff request from the already connected mobile terminal device 200 (mobile terminal device 200*a* in FIG. 8), the connection cutoff unit 34 outputs an image message or a sound message for asking the user (passenger) whether to permit or refuse the cutoff to the display 12, the speaker (not shown), or the like, to allow the user to select permission or refusal. When the user selects the permission for cutoff, the connection control unit 34 cuts off the connection to the mobile terminal device 200. When the user selects the refusal for cutoff, the connection control unit 34 refuses the cutoff to the mobile terminal device 200 and keeps the connection.

The data transmitting unit 35 transmits the data displayed on the display 12 to the mobile terminal device transmitting an acquisition request for the data display on the display 12. Specifically, the data transmitting unit 35 receives a URL from the mobile terminal device 200 (mobile terminal device 200*a* in FIG. 8) and displays the data A acquired from the URL on the display 12. When the data transmitting unit 35 receives an acquisition request of the data A displayed on the display 12 from the other mobile terminal device (mobile terminal device 200*b* in FIG. 8) different from the mobile terminal device 200, the data transmitting unit 35 acquires the data A from the display data 15*b* stored in the storage unit 15 and transmits the data A to the different mobile terminal device using at least one data type of text data and image data.

(Configuration of Mobile Terminal Device 200 According to Embodiment 2)

As shown in FIG. 9, the mobile terminal device 200 is provided with a communication unit 201, an input unit 202, a storage unit 203, and a search processing unit 204.

The communication unit 201 communicates with the in-vehicle device 10 or the handsfree device 100 by wireless. The communication unit 201 transmits and receives data to and from the in-vehicle device 10 or the handsfree device 100 in two ways on the basis of the communication standard of, for example, Bluetooth (registered trademark). In the embodiment, the case of performing the wireless communication between the in-vehicle device 10, the handsfree device 100, and the mobile terminal device 200 is described, but the communication may be performed by wire.

The input unit 202 is an input device formed by operation buttons, a cursor key, and the like, and performs a process of transferring an input from the passenger, to the search processing unit 204 or the like. In the embodiment, the case of performing an operation to designate the display place or the like for the screen data through the input unit 202 of the mobile terminal device 200 is mainly described, but such an operation may be performed through the input unit 11 of the in-vehicle device 10.

The storage unit 203 stores programs and the like executed by the search processing unit 204, and for example, stores URL or data searched through the internet by the search processing unit 204, as cache data.

The search processing unit 204 searches various kinds of data or home pages through the internet. Specifically, the search processing unit 204 determines whether to search the internet or cache data from the storage unit 203 by an instruction operation of a user. For example, when the user selects the cache data as an access destination, the search processing unit 204 accesses the storage unit 203 and searches the cache data. When the user selects the internet as the access destination, the search processing unit 204 accesses the internet and searches data. The search processing unit 204 transmits the searched URL or data to the in-vehicle device 10 through the communication unit 201.

(Process Flow according to Embodiment 2)

Figure 10:
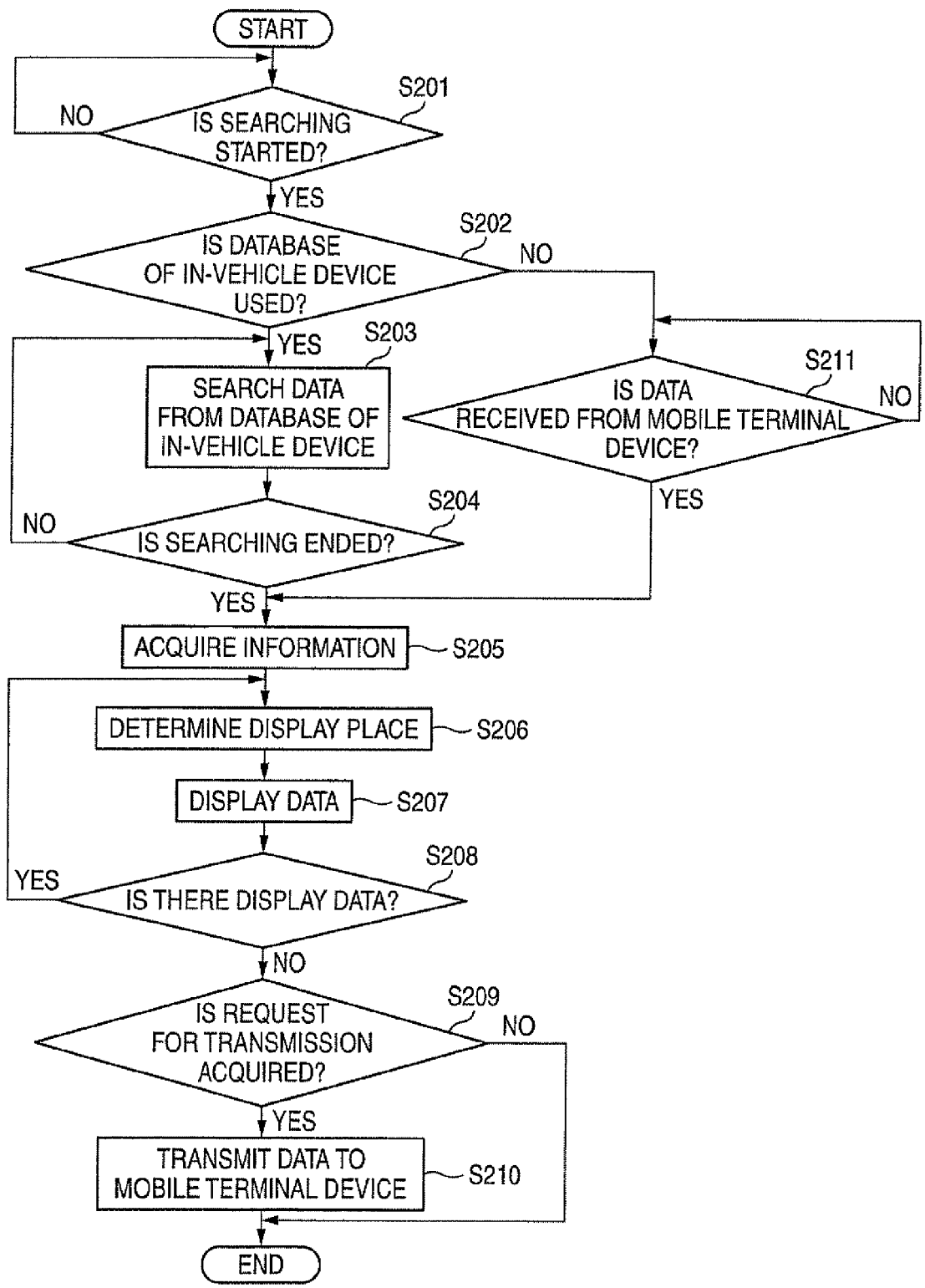
FIG. 10 is a flowchart illustrating process flow of the in-vehicle device according to Embodiment 2.
Figure 11:
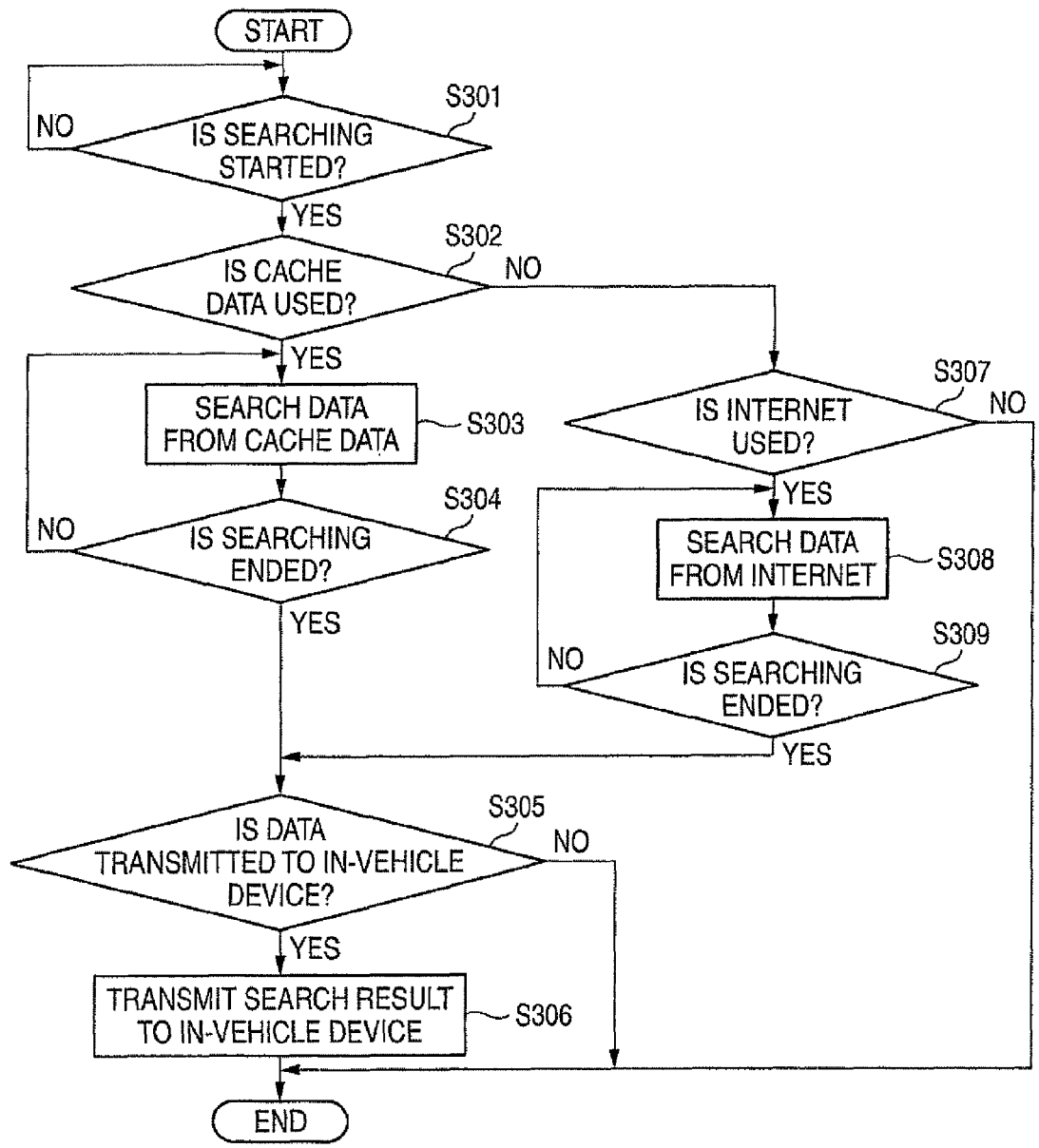
FIG. 11 is a flowchart illustrating process flow of a mobile terminal device according to Embodiment 2.
Figure 12:
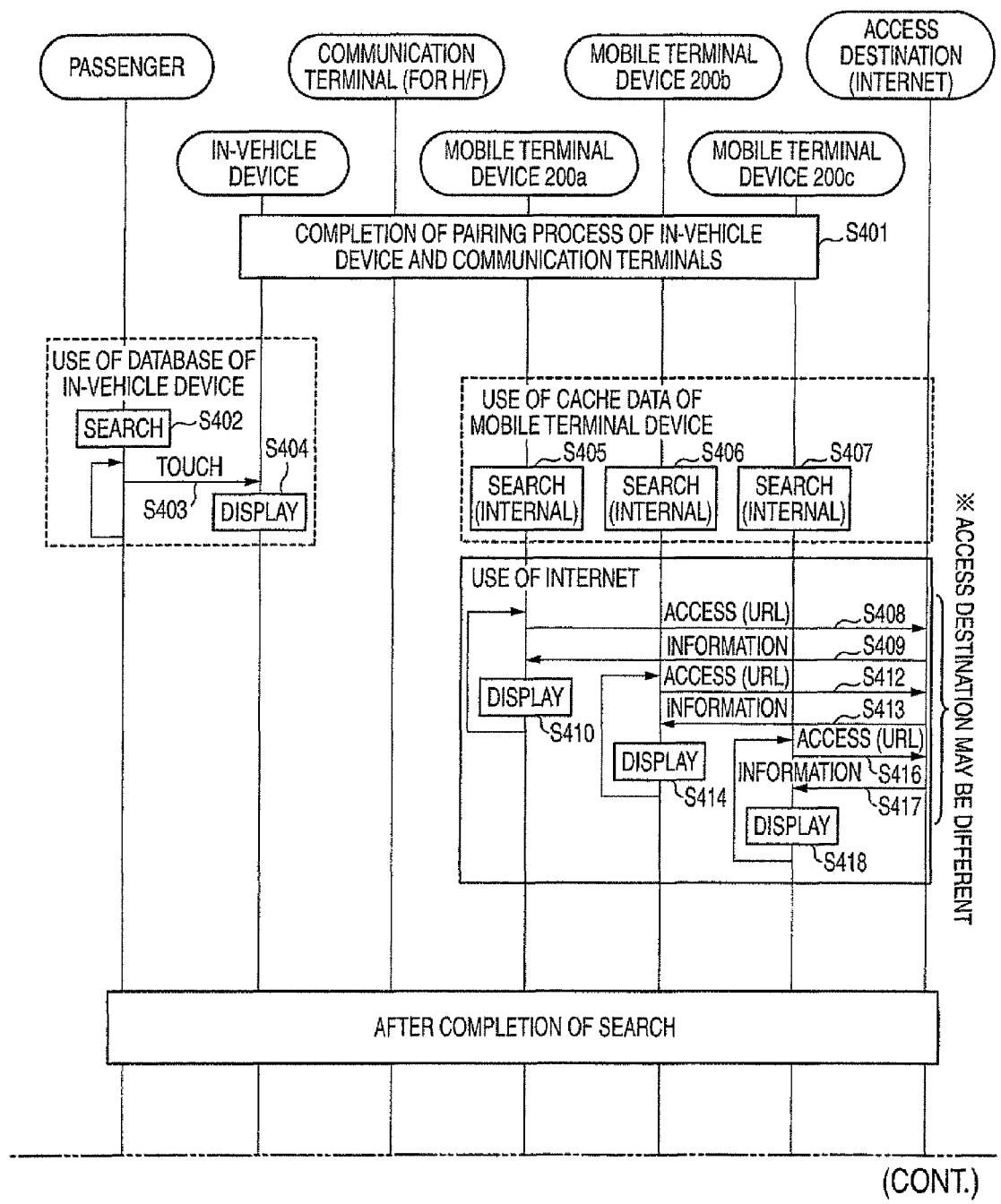
FIG. 12 is a diagram illustrating process sequence of the screen display system including the in-vehicle device according to Embodiment 2.

Next, process flow in the screen display system including the in-vehicle device according to Embodiment 2 will be described with reference to FIG. 10 to FIG. 12. FIG. 10 is a flowchart illustrating process flow in the in-vehicle device according to Embodiment 2, and FIG. 11 is a flowchart illustrating process flow in the mobile terminal device according to Embodiment 2. FIG. 12 is a sequence diagram illustrating process sequence of the screen display system including the in-vehicle device according to Embodiment 2.

(Process Flow in In-Vehicle Device)

As shown in FIG. 10, when a search is started by an instruction operation of a user (passenger) (Step S201: Yes), the in-vehicle device 10 asks the user or the like whether or not to use the database in the in-vehicle device 10 (Step S202). As the asking method, for example, there is a method of display buttons of "use of DB" and "use of mobile terminal device" on the display 12 to allow the user to select any one of them.

When the database in the in-vehicle device 10 is used (Step S202: Yes), the in-vehicle device 10 displays a data list stored as the display data 15b in the storage unit 15 thereof on the display 12 and allows the user to search for the desired data (Step S203 and Step S204: No).

Then, when the desired data is found and the search is completed (Step S204: Yes), the in-vehicle device 10 acquires the selected desired data from the storage unit 15 (Step S205), determines the display place on the display 12 in the same manner as that of Embodiment 1 (Step S206), adjusts the desired data searched by the user as described in Embodiment 1, and displays the data on the display 12 (Step S207).

So long as there is the data selected by the user, that is, the displayed data (Step S208: Yes), the in-vehicle device 10 repeats Step S206 and Step S207. When the displayed data disappears (Step S208: No), it is determined whether or not a transmission request of the display data is received from the mobile terminal device (Step S209).

When the in-vehicle device 10 receives the transmission request of the displayed data from the mobile terminal device (Step S209: Yes), the in-vehicle device 10 acquires the data displayed on the display 12 from the storage unit 15 and transmits the data to all the mobile terminal devices transmitting the transmission request (Step S210) and the process is ended.

Meanwhile, when the in-vehicle device 10 does not receive the displayed data from the mobile terminal device (Step S209: No), the process is ended.

Returning to Step S202, when the user selects not to use the database in the in-vehicle device 10 (Step S202: No), the in-vehicle device 10 waits until data (URL) is transmitted from the mobile terminal device connection to the in-vehicle device 10 (Step S211).

When the in-vehicle device 10 receives the data (URL) from the mobile terminal device connected thereto (Step S211: Yes), the in-vehicle device 10 accesses the received URL and acquires data (Step S205) and performs the processes of Step S206 to S210.

(Process Flow in Mobile Terminal Device)

Next, process flow in the mobile terminal device will be described with reference to FIG. 11. As shown in FIG. 11, when a search is started by an instruction operation of a user (owner) (Step S301: Yes), the mobile terminal device 200 asks the user whether or not to use cache data on a display unit such as the display (Step S302). In addition, the mobile terminal device 200 may display a button of, for example, "search from cache data" to allow the user to select it.

When the user selects to use the cache data (Step S302: Yes), the mobile terminal device 200 displays a list or the like of the cache data on the display from the storage unit 203 and allows the user to search for the desired data (Step S303).

Then, when the user searches for the desired data (Step S304: Yes), the mobile terminal device 200 asks the user whether or not to transmit the selected data to the in-vehicle device 10 (Step S305). In addition, the mobile terminal device 200 may display buttons of, for example, "transmission" and "non-transmission" to allow the user to select any one of them.

When the user selects the transmission (Step S305), the mobile terminal device 200 acquires the data selected by the user from the storage unit 203 and transmits the data to the in-vehicle device (Step S306) and the process is ended. When the transmission is not selected (Step S305: No), the process is ended.

Returning to Step S302, when the user does not select to use the cache data (Step S302: No), the mobile terminal device 200 accesses the internet and asks the user whether or not to search for the desired data (Step S307). The mobile terminal device 200 may displays a button of, for example, "search from internet" to allow the user to select it.

When the user selects to use the internet (Step S307: Yes), the mobile terminal device 200 accesses various URLs of the internet by an operation of the user and allows the user to search for the desired data (Step S308). When the user searches for the desired data (Step S309: Yes), the mobile terminal device 200 performs the process after Step S305.

Meanwhile, when the user does not select to use the internet (Step S307: No), the mobile terminal device 200 ends the process.

(Process Sequence of Screen Display System)

Next, process sequence of the screen display system will be described with reference to FIG. 12. In FIG. 12, an example where passengers in the vehicle perform a search at the same time, specifically, an example where one passenger in the vehicle searches the database of the in-vehicle device and the other passenger searches the internet using the mobile terminal device will be described.

As shown in FIG. 12, a pairing process is performed between the in-vehicle device 10 and the mobile terminal devices 200a to 200c to establish connection, and thus the in-vehicle device 10 can recognize that the connection to what device is established (Step S401).

Any one passenger (e.g., person in a passenger seat) operates the display or the like of the in-vehicle device 10 to access the display data 15b stored in the storage unit 15 of the in-vehicle device and to search for the desired data, and when the desired data is searched (Step S402 to S403), the in-vehicle device 10 displays the data on the display (Step S404).

While the one passenger searches the desired data from the database of the in-vehicle device, the other passengers (e.g., people in the back seats) access the cache data described with reference to FIG. 10 or the internet and search for the desired data (URL) using their own mobile terminal devices (mobile terminal devices 200a to 200c) (Step S405 to Step S418).

The other passengers transmit each of the search results (URL) from the mobile terminals to the in-vehicle device 10 at the time of completing each search (Step S411 to Step S422).

Then, the in-vehicle device 10 receiving the result searched by each mobile terminal device accesses the URL of the search result every time when receiving the search result, acquires data consumed by the user of each mobile terminal device, performs the adjustment described in Embodiment 1, and displays the acquired data on the display (Step S423 to Step S426).

Thereafter, when the in-vehicle device 10 receives a data transmission request from the mobile terminal device (Step S427) or when the in-vehicle device 10 receives a data transmission instruction to a specific mobile terminal device by the passenger operating the in-vehicle device 10 (Step S428 and Step S429), the in-vehicle device 10 transmits URL or the like of the data displayed on the display to the mobile terminal device receiving the data transmission request or the mobile terminal device receiving the data transmission instruction (Step S430 to Step S433).

As a method of the data transmission instruction, for example, there is a method in which the in-vehicle device 10 outputs a screen for allowing a user to select a transmission destination to the display or the like and the user selects it since the in-vehicle device 10 can individually recognize the mobile terminal devices, instead of performing the pairing process between the in-vehicle device 10 and the mobile terminal device. In FIG. 12, the case of receiving the data transmission request from all the mobile terminal devices or receiving the data transmission instruction for all the mobile terminal devices is shown, but is not necessarily limited thereto. For example, the data may be transmitted to one mobile terminal device.

As described above, the mobile terminal devices acquire the URL searched by the passengers and displayed on the in-vehicle device 10, access the acquired URL, and display the data on the display (Step S434 to Step S445).

(Advantage of Embodiment 2)

As described above, according to Embodiment 2, the disposition information about the plurality of partial areas disposed on the display area of the display and the partial area information about the priority indicating the correspondence order of the screen data are registered in the storage unit, the data specified by the data information is acquired when the data information specifying the data displayed on the display is received from the mobile terminal devices, the display area is adjusted by associating the data with any one of the partial areas on the basis of the priority included in the partial area information, and the data associated with the partial area is displayed on the display on the basis of the disposition information included in the partial area information.

As a result, the plurality of information is searched at the same time using the plurality of mobile phones or the like carried in the vehicle, the search results are displayed in the vehicle, and thus it is possible to share the information. In addition, it is easy to perform the transmission by using a wireless communication method such as Bluetooth. Moreover, since it is possible to use normally used mobile terminals, it is possible to reduce the costs of purchasing special devices.

According to Embodiment 2, the storage unit storing the data displayed in the past is provided, the data designated by the instruction operation of the user is acquired from the storage unit, and the data is associated with any one of the partial areas on the basis of the priority included in the partial area information, thereby adjusting the display area. As a result, since it is possible to use the data (cache data) displayed in the past, it is possible to reduce communication costs.

Since the data displayed on the display is transmitted to the mobile terminal device transmitting the acquisition request of the data displayed on the display, the passengers can browse the information with their own mobile phones or the like, not from the display of the in-vehicle device. Accordingly, it is possible to remove inconvenience to the passengers caused by the acquisition of information.

When the connection request is received from the other mobile terminal devices different from the plurality of already connected mobile terminal devices, the connection to the other mobile terminal devices is permitted or refused on the basis of the predetermined condition. As a result, it is possible easily to connect the mobile phones of passengers taking the vehicle on their way.

It is possible to cut off the connection to the already connected mobile terminal devices on the basis of the predetermined condition. As a result, it is possible easily to cut off a terminal infected with a virus or a terminal with a fault, and thus it is possible to prevent secondary damage.

The in-vehicle device according to the embodiment can transmit data to the mobile terminal devices using at least one data type of the text data and the image data. As a result, it is possible to transmit the data according to a communication speed or a using system (e.g., packet fee is a flat rate, etc.) of a user.

The in-vehicle device according to the embodiment can display together the information specifying the mobile terminal device transmitting the data information specifying the data when displaying the data on the display. As a result, it is possible to share what any one mobile terminal device (passenger) transmits of whatever information to the in-vehicle device (i.e., any mobile terminal device (passenger) searches whatever information) in the vehicle.

As described above, the in-vehicle device and the display control system according to the invention are suitable for screen control in a circumstance where it is difficult to perform screen operations, and particularly, suitable for screen control in a mobile object such as a car in which it is difficult to look at the screen from the viewpoint of safety.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An in-vehicle device for displaying a plurality of screen data generated by a mobile terminal device on one display of the in-vehicle device, the in- vehicle device comprising:

a registering unit configured to register partial area information in which disposition information indicating disposition of each of a plurality of partial areas which are disposed on a display area of the display are associated with priority information indicating priority of each of the partial areas;

a adjusting unit configured to adjust the display area by allocating one of the screen data to one of the partial areas based on the priority information included in the partial area information when receiving a request to display the one of the screen data on the display; and
a display control unit configured to display the one of the screen data allocated to the one of the partial areas on the display based on the disposition information included in the partial area information.

2. The in-vehicle device as set forth in claim 1,
wherein the partial area information includes fixation information indicating whether or not each of the allocation relations between the screen data and the partial areas is fixed, and
wherein the adjusting unit reallocates one of the screen data to one of the partial areas when another of the screen data is allocated to another of the partial areas to which the one of the screen data has been allocated based on the fixation information and the priority information.

3. The in-vehicle device as set forth in claim 2, further comprising a keeping unit configured to keep one of the screen data when another of the screen data is allocated to one of the partial areas to which the one of the screen data has been allocated and there is no partial area to be reallocated to the one of the screen data.

4. The in-vehicle device as set forth in claim 1, further comprising a notifying unit configured to notify the mobile terminal device of a size of one of the partial areas to which one of the screen data is allocated to allow the mobile terminal to change a size of the one of the screen data in accordance with the size of the one of the partial areas.

5. The in-vehicle device as set forth in claim 1,
wherein the registering unit registers a plurality of partial area information, and
wherein the in-vehicle device further comprising a selection unit configured to allow a user to select one of partial area information to be used from among the plurality of partial area information.

6. The in-vehicle device as set forth in claim 1,
wherein the registering unit registers a plurality of partial area information, and
wherein the adjusting unit switches one of partial area information to be used based on the number of the screen data to be displayed when receiving a request to display the screen data.

7. A display control system comprising:
a mobile terminal device configured to generate a plurality of screen data; and
an in-vehicle device configured to display the screen data on one display of the in-vehicle device,
wherein the in-vehicle device includes:
a registering unit configured to register partial area information in which disposition information indicating disposition of each of a plurality of partial areas which are disposed on a display area of the display are associated with priority information indicating priority of each of the partial areas;
a adjusting unit configured to adjust the display area by allocating one of the screen data to one of the partial areas based on the priority information included in the partial area information when receiving a request to display the one of the screen data on the display; and
a display control unit configured to display the one of the screen data allocated to the one of the partial areas on the display based on the disposition information included in the partial area information, and
wherein the mobile terminal device includes an input unit configured to designate the one of the partial area on which the one of the screen data is displayed from the partial areas.

8. The display control system as set forth in claim 7,
wherein the in-vehicle device further includes a notifying unit configured to notify the mobile terminal device of a size of one of the partial areas to which one of the screen data is allocated, and
wherein the mobile terminal device further includes a generating unit configured to change a size of the one of the screen data in accordance with the size of the one of the partial areas.

9. An in-vehicle device which is connectable to a plurality of mobile terminal devices via wireless communication and is configured to display a plurality of data on one display of the in-vehicle device, the in-vehicle device comprising:
a registering unit configured to register partial area information in which disposition information indicating disposition of each of a plurality of partial areas which are disposed on a display area of the display are associated with priority information indicating priority of each of the partial areas;
a adjusting unit configured to receive information specifying one of data to be displayed from one of the mobile terminal devices, acquire the one of data to be displayed based on the information and adjust the display area by allocating the one of the data to one of the partial areas based on the priority information included in the partial area information; and
a display control unit configured to display the one of the data allocated to the one of the partial areas on the display based on the disposition information included in the partial area information.

10. The in-vehicle device as set forth in claim 9, further comprising a storing unit configured to store data displayed on the display in the past,
wherein the adjusting unit acquires stored data and adjust the display area by allocating the acquired data to one of the partial areas based on the priority information included in the partial area information.

11. The in-vehicle device as set forth in claim 9, further comprising a transmitting unit configured to transmit data displayed on the display to one of the mobile terminal devices which transmits an acquisition request of the data displayed on the display.

12. The in-vehicle device as set forth in claim 11, wherein the transmitting unit transmits the data using at least one data type of text data and image data.

13. The in-vehicle device as set forth in claim 9, further comprising a connection control unit configured to permit or refuse connection to a mobile terminal device which is different from the mobile terminal devices which have been already connected based on a predetermined condition when receiving a connection request from the mobile terminal device.

14. The in-vehicle device as set forth in claim 9, further comprising a cutoff unit configured to cut off connection to one of the mobile terminal devices which has been already connected based on a predetermined condition.

15. The in-vehicle device as set forth in claim 9, wherein the display control unit displays the one of the data together with information indicating one of the mobile terminal devices which transmits information specifying the one of the data.

16. A display device designed to be mounted on a vehicle, the display device comprising:

a display including a first partial area and a second partial area which are positionally fixed, a controller configured to control the display, wherein:

when receiving a first image, the controller controls the display to display the first image on the first partial area;

when receiving a second image during the first image is displayed on the first partial area, the controller controls the display to display the second image on the second partial area;

when receiving a third image during the first and second images are displayed on the first and second partial areas, respectively, the controller controls the display to display the third image on the first partial area and the first image on the second partial area;

the display device is configured to be communicatably connected to at least one mobile terminal device; and the display device is configured to receive the first image, the second image and the third image directly from the at least one mobile terminal device.

17. The display device as set forth in claim 16, wherein:

the display device is configured to be communicatably connected to an external network;

the display device has a storage; and the display device is configured to acquire the first image, the second image and the third image from at least one of the at least one mobile terminal device, the external network and the storage in response to an instruction from a user of the display device or a user of the at least one mobile terminal device.

18. The display device as set forth in claim 16, wherein:

the display further including a third partial area which is positionally fixed, when receiving a fourth image, the controller controls the display to display the fourth image on the third partial area, when receiving a fifth image during the first, second and fourth images are displayed on the first, second and third partial areas, respectively, the controller controls the display to display the fifth image on the first partial area, the first image on the second partial area, and fourth image on the third partial area.

19. The display device as set forth in claim 16, further comprising a storage, wherein:

when receiving a third image during the first and second images are displayed on the first and second partial areas, respectively, the controller controls the display not to display the second image and the storage stores the second image.

\* \* \* \* \*